Sept. 2, 1969    D. TWERSKY    3,464,203
STOCK FEEDING APPARATUS
Filed March 15, 1967
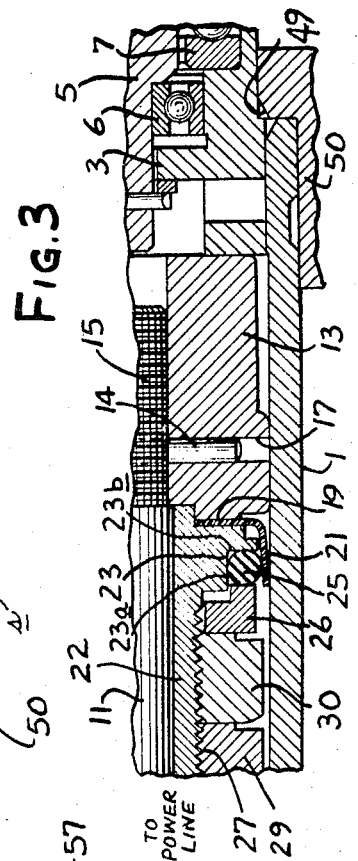
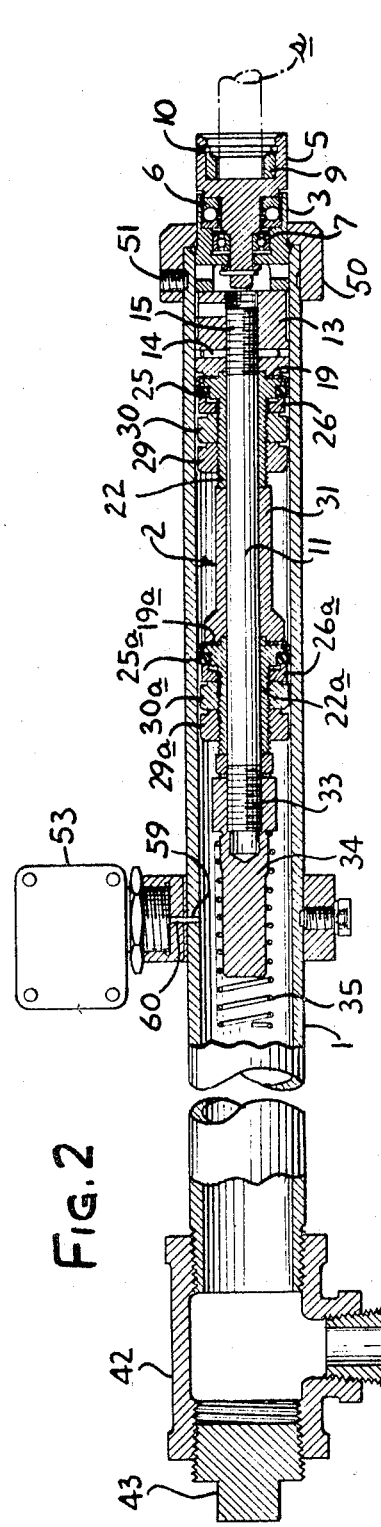
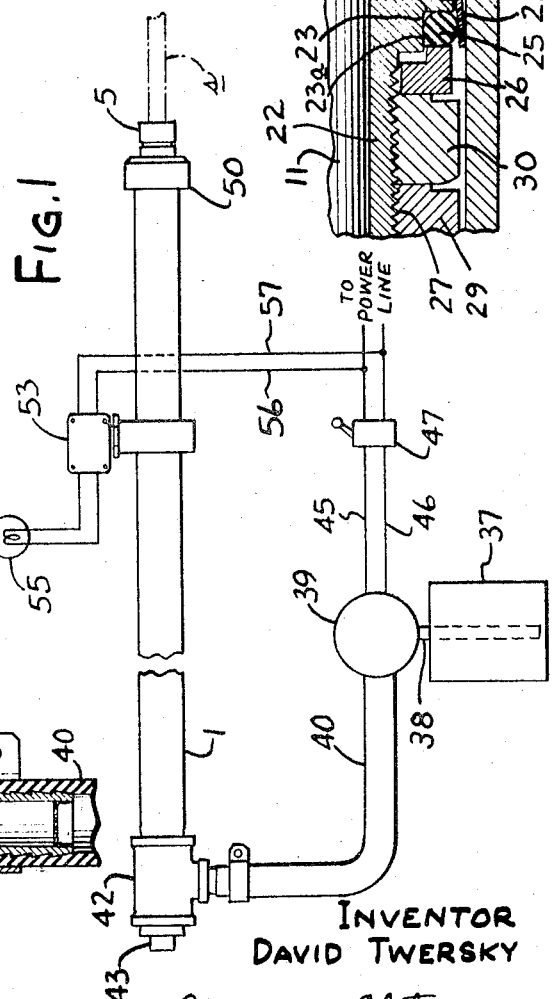
INVENTOR
DAVID TWERSKY
by: Spector & Alster
ATTYS.

United States Patent Office
3,464,203
Patented Sept. 2, 1969

3,464,203
STOCK FEEDING APPARATUS
David Twersky, Morton Grove, Ill., assignor to Esterline Corporation, New York, N.Y., a corporation of Delaware
Filed Mar. 15, 1967, Ser. No. 623,408
Int. Cl. F15b 15/18; F01b 25/00
U.S. Cl. 60—52                     6 Claims

ABSTRACT OF THE DISCLOSURE

Apparatus for feeding stock to a machine tool comprises a tube for receiving the stock, a piston assembly within the tube for maintaining pressure against the stock to feed it as required by the machine tool, a reversible pump, and a switch and signal means. The piston has cup-shaped plastic seals to prevent leakage of oil past the piston. Resilient O-rings are telescoped within the seals to urge them against the inside wall of the tube. To compensate for wear on the seals, mechanism is provided to expand the O-rings which thereby expand the seals.

---

This invention relates to apparatus for feeding bar or tube stock to machine tools, such as automatic screw machines.

Apparatus of the foregoing type includes a stock-receiving tube and a hydraulically actuated piston assembly within the tube for maintaining pressure against the stock to feed it as required by machine tool. The piston assembly includes cup-shaped seals to maintain oil pressure in the stock tube and to prevent leakage of the oil past the piston. In time the seals may become worn, and to compensate therefor the present invention has for an object the provision of a novel means for adjustment of the seals to maintain them in sealing engagement with the inside wall of the stock tube. For this purpose, each cup-shaped seal has a rubber-like O-ring telescoped therewithin and in engagement with the axial flange of the seal. Adjusting mechanism is provided for applying axial pressure to the O-ring to expand the same radially and maintain it in its adjusted position of expansion. The radial expansion of the O-ring diametrally expands the seal flange and holds it in sealing engagement with the inside wall of the stock tube.

The attainment of the above and further objects of this invention will be apparent from the following description taken in conjunction with the accompanying drawing forming a part thereof.

In the drawing:

FIG. 1 is a front elevational view, partially diagrammatic, or apparatus constructed in accordance with and embodying the present invention;

FIG. 2 is a fragmentary sectional view of the apparatus taken along the longitudinal axis of the stock-receiving tube; and FIG. 3 is a sectional view showing a portion of FIG. 2 on an enlarged scale.

Referring now in more detail to the drawing, which illustrates a preferred embodiment of this invention, 1 designates a stock-receiving cylindrical tube within which is mounted an axially slidable piston 2 and a stock-engaging head 3 which pushes against a bar or tube of stock s. The stock tube 1 may be horizontally supported in proper relation to the machine tool by suitable columns, brackets or the like in a conventional manner.

Since the machine tool into which the stock s is being fed usually has a rotating chuck for gripping stock s, the head 3 includes a revolvable member 5 that is journalled in bearings 6, 7. A bushing 9 is removably held in a recessed end of the revolvable member 5 by a snap ring 10. The stock s loosely telescopes within the bushing 9 so that the latter prevents any substantial eccentric movement of the telescoped end of the stock. The bushing 9 is interchangeable with other bushings having different internal diameters, and the particular size of bushing 9 used will depend upon the external diameter of the stock s.

The piston 2 has a piston rod 11 with a piston head 13 threaded thereon. A dowel pin 14 extends diametrally through the threaded part 15 of the piston rod 11 and into aligned openings 17 to retain piston head 13 in fixed position on the piston rod 11. Adjacent to the piston rod 11 is a cup-shaped seal 19 that is formed of a unitary piece of flexible polytetrafluoroethylene, which is a known plastic commonly sold under the trademark "Teflon." The seal 19 has an annular, generally axially extending flange 21 for sealing engagement with the interior surface of the stock tube 1. The seal 19 is held in position on the piston assembly 2 by the cooperation of the piston head 13 and a collar 22 on the piston rod 11, the collar 22 and piston head 13 clinching the radially extending portion of the seal 19 therebetween.

The collar 22 has an annular seat 23 for receiving a resilient O-ring 25 that telescopes within the seal flange 21. As best seen in FIG. 3, the seat 23 has an axial portion 23a for supporting the O-ring 25 at its inner circumference and a radial portion 23b for supporting one axial end of the O-ring 25. The O-ring 25 may be molded of a suitable oil-resistant elastomer such as polychloroprene synthetic rubber. Slip-fitted over the collar 22 is an O-ring expander 26 which is adapted to apply axial pressure to the O-ring 25. Remote from the O-ring seat 23, the collar 22 has an external thread 27 for receiving two jam nuts 29, 30, the former serving as a lock nut for the latter. The jam nuts 29, 30 are tightened up against the O-ring expander 26 to maintain axial pressure on the O-ring 25 causing the O-ring 25 to distend by expanding its external diameter and thereby urge the cup-seal flange 21 into a tight seal against the inside wall of the stock tube 1. This seals against oil leakage past the piston 2, but because of the relatively low coefficient of friction of the material of the seal 19, the piston may slide freely within the stock tube 1.

To insure an effective seal fit of the piston within the stock tube 1, a similar sealing structure and O-ring expanding mechanism may be employed which is axially spaced from the previously described arrangement by a spacer sleeve 31 on the piston rod 11. The parts of this additional seal structure corresponding to those of the first mentioned one have the same reference numerals followed by the letter a.

The end of the piston rod 11 that is opposite to the threaded end 15 also has a thread 33 for receiving a spring-bumper support 34. A coil spring 35 is telescoped over the support 34 and serves to cushion the piston assembly as it reaches the end of its return stroke, which is to the left, viewed from FIG. 2.

The piston is operated by oil which is withdrawn from an oil reservoir 37 through an intake tube 38 and is pumped by a reversible hydraulic pump 39 through a flexible hose 40 and into the stock tube 1. For this purpose, the end of the hose 40 may be clamped to a nipple 41 which, together with the end of the stock tube 1, is threaded into T fitting 42. The remaining opening of the T fitting 42 may be closed off by a conventional plug 43. The electric motor for the hydraulic pump has current supplied thereto from a power line through conductors 45, 46 and a suitable on-off-reversing switch 47.

Assume that the piston 2 is at the rear of the stock tube 1 so that the spring 35 is adjacent to the plug 43, the head 3 is abutting the piston head 13, and the tube 1 has been loaded with a length of stock s. The switch 47 may be operated to pump oil into the stock tube 1 to apply pressure to the piston 2 tending to urge it to the right, FIG. 2. As the machine tool consumes material from the stock s, the oil pressure will move the piston 2, the head 3, and the stock s to the right, all the time applying continous pressure to the stock s. When the piston 2 and head 3 reach substantially the positions shown in FIGS. 2 and 3, the head 3 will abut an angular shoulder 49 on a stop collar 50 which is secured to the end of the stock tube 1 by a set screw 51. The direction of the pump will then be reversed to withdraw oil from the stock tube 1. The air pressure on the front side of the piston 2 causes the piston 2 to be retracted from the head 3 and move to the left until the spring bumper 35 hits the plug 43. An additional length of stock s may then be inserted into the bushing 9, and by pushing on the stock s it is loaded into the stock tube 1 and the head 3 is pushed back against the piston head 13.

A signalling device may be used to indicate when the supply of stock s within the stock tube 1 is approaching exhaustion. For this purpose, a hydraulic pressure switch 53 may be suitably clamped to the stock tube 1 to operate a lamp 55, the current for which is supplied through conductors 56, 57. The stock tube 1 has a radial hole 59 which is in alignment with a hole 60 in the switch support so that oil under pressure in the stock tube 1 may operate the switch when the piston 2 has moved to the right past the holes 59, 60. When the piston 2 is retracted past the holes 59, 60, the oil pressure will be relieved from pressure switch 53, thereby turning off the lamp 55. The pressure switch 53 is conventional and is, therefore, not shown or described in detail.

As the seal cups 19, 19a become worn, the O-rings 25, 25a may be expanded to maintain the seal flanges 21 in proper contact with the stock tube 1. This may be done by loosening the nuts 29, 29a and then tightening the nuts 30, 30a the proper amount, then retightening the nuts 29, 29a.

The precise constructions herein shown are illustrative of the principles of the invention.

What is considered new and sought to be secured by Letters Patent is:

1. In a stock feeding apparatus having a tube for receiving stock material, a piston slidable in said tube, means including a pump for supplying hydraulic fluid to the tube to drive the piston toward one end of said tube to push the stock along the tube, means by which the pump may be reversed to withdraw fluid from said tube and move the piston toward the other end of said tube, a switch adjacent to said one end of the tube and operable by hydraulic pressure in the tube when the piston has reached a predetermined position in the tube during its advance of the stock material, signalling means actuated by said operation of the switch, sealing means mounted on said piston, resilient O-ring means for imposing radial pressure on said sealing means to urge said sealing means into slidable engagement with the interior wall of said tube, and means for diametrally expanding said O-ring means.

2. Apparatus according to claim 1 in which said sealing means comprises axially spaced cups, each having an axial flange that engages said interior wall, an O-ring is telescoped within each flange, and the means for diametrally expanding said O-ring means comprises an axial seat for supporting each O-ring, an expander ring adjacent to each O-ring and at the axial end thereof that is opposite to the associated seat, and a threaded member adjacent to each expander ring for adjustably imposing axial pressure on each O-ring.

3. In a stock feeding apparatus, a tube for receiving stock material, a piston slidable in said tube, sealing means mounted on said piston, said sealing means comprising a flexible cup-shaped seal with an annular generally axially extending flange, a resilient O-ring telescoped within said flange for engagement therewith, adjustable means for applying sufficient axial pressure to said O-ring to expand said O-ring diametrally to urge said flange into slidable substantially sealing engagement with the interior wall of said tube, means including a pump for supplying hydraulic fluid to the tube to drive the piston toward one end of the tube to advance the stock along the tube, means by which the pump may be reversed to withdraw fluid from said tube and move said piston toward the other end of the tube, a switch operable by hydraulic pressure, means forming a hydraulic conduit from the switch to an opening in the wall of said tube to operate said switch by hydraulic pressure in the tube when the piston has moved past said opening during the advance of the stock material, and signalling means actuated by the operation of said switch.

4. Apparatus according to claim 3 further including means forming an annular seat for supporting said O-ring at its inner diameter and a radial seat telescoped within said flange for supporting one axial end of said O-ring in axially spaced relation to a radial portion of said seal, said radial portion being clinched between said seat-forming means and an adjacent part of said piston.

5. Apparatus according to claim 4, in which said seal is formed of a polytetrafluoroethylene resin and said O-ring is formed of a rubber-like elastomer.

6. Apparatus according to claim 3, in which said piston has a piston head, means forming an annular seat for said O-ring and cooperating with said piston head for clinching a radial portion of said seal therebetween.

References Cited
UNITED STATES PATENTS

| | | | |
|---|---|---|---|
| 994,558 | 6/1911 | Aspinwall | 92—250 X |
| 1,022,865 | 4/1912 | Nicolai | 92—5 X |
| 1,108,952 | 9/1914 | Wales | 91—1 |
| 1,482,734 | 2/1924 | Carrow | 92—251 X |
| 1,955,157 | 4/1934 | Wayne | 92—251 X |
| 2,327,916 | 8/1943 | Mariotte | 214—1.4 |
| 2,572,741 | 10/1951 | McCoy | 214—1.4 |
| 2,635,427 | 4/1953 | Baugh et al. | 60—52 |
| 2,701,355 | 2/1955 | Rinehart et al. | 60—52 X |
| 2,814,540 | 11/1957 | Southerwick | 92—250 X |
| 2,830,859 | 4/1958 | Parsons | 60—52 X |

MARTIN P. SCHWADRON, Primary Examiner

I. C. COHEN, Assistant Examiner

U.S. Cl. X.R.

91—1; 92—5, 250, 251